Jan. 29, 1935.　　　W. H. EVANS　　　1,989,476
EXPANSION REAMER
Filed Sept. 26, 1931　　2 Sheets-Sheet 1

Inventor
William H. Evans
By George E. Mueller
Atty.

Jan. 29, 1935.     W. H. EVANS     1,989,476
EXPANSION REAMER
Filed Sept. 26, 1931     2 Sheets-Sheet 2
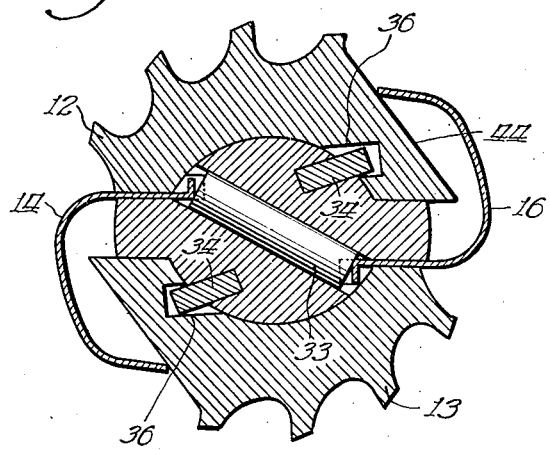
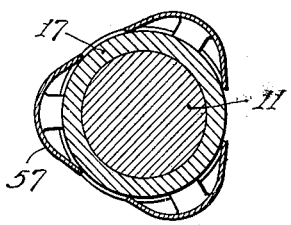
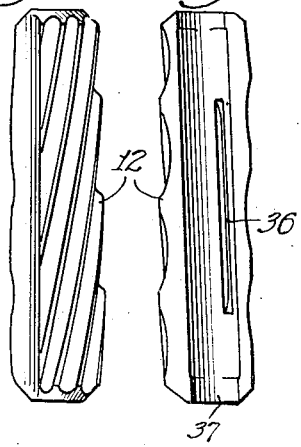
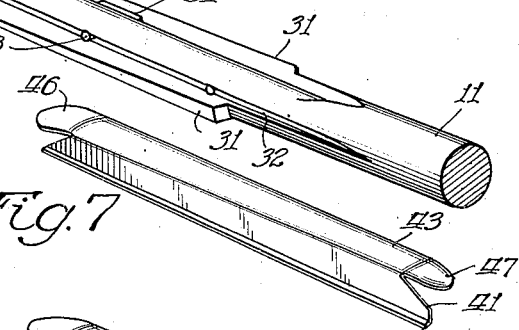
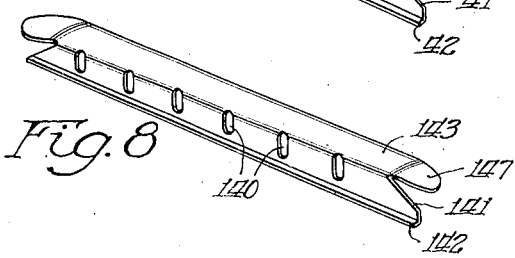
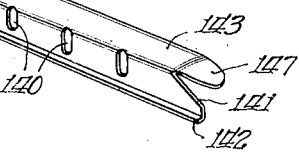
Inventor
William H. Evans
By George E. Mueller Atty.

Patented Jan. 29, 1935

1,989,476

UNITED STATES PATENT OFFICE 1,989,476

EXPANSION REAMER

William H. Evans, Chicago, Ill., assignor to Evans Flexible Reamer Corporation, Chicago, Ill., a corporation of Illinois Application September 26, 1931, Serial No. 565,381

14 Claims. (Cl. 77—75.5)

My invention relates to reamers, and more in particular to expansion reamers.

The principal object of the present invention is the construction of an improved reamer.

Another object is the provision of a reamer having a relatively wide range of adjustments and capable of cutting a circular opening at any adjustment.

Another object is the provision of improved guide means for a reamer.

Another object is the provision of an improved reamer construction wherein there is no tendency for the blades of the reamer to "dig in" or "chatter".

Another object is the provision of a reamer having a long useful life.

Other objects and features of the invention will be apparent from the following detailed description taken from accompanying drawings, wherein Fig. 1 is an elevational view showing one embodiment of my invention;

Fig. 4 is an enlarged transverse sectional view taken along the line 4—4 of Fig. 2;

Fig. 5 is a slightly enlarged sectional view taken along the line 5—5 of Fig. 2;

Fig. 6 is a fragmentary perspective view of the mandrel;

Figs. 7 and 8 show two forms of spring guides; and

Figs. 9 and 10 are top and bottom views of the cutting segments.

Figure 1:
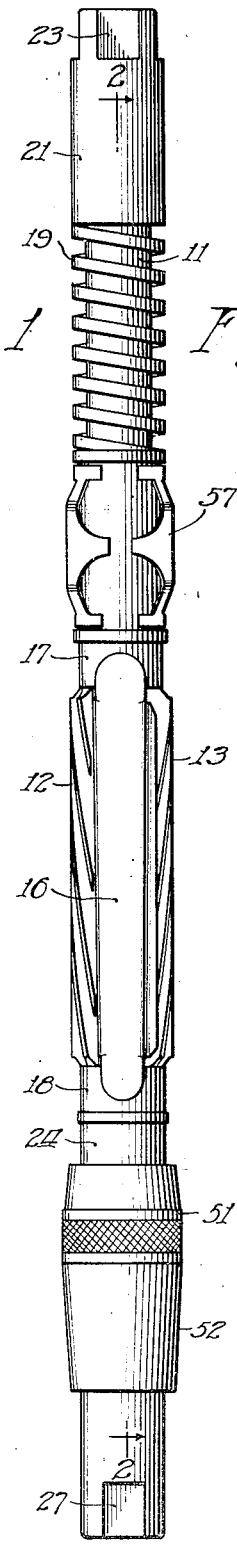

According to the main features of the invention, I mount the cutting segments in such a way as to cause them to cut in back of the center line mid-way between the front and rear edges at all adjustments. The blades are so arranged that, as the diameter of the opening increases, the cutting area on the segment recedes toward the trailing edge thereof. The cutting segments are so mounted on the mandrel as to avoid any possibility of digging into the surface which they are cutting. Spring centering guides disposed between the cutting segments are designed to bear against the cutting segments near the front edge thereof, and the centering guides are arranged in such a way as to adjust themselves for different sized openings and to maintain the reamer in axial alignment with the hole being reamed.

The features of the invention are embodied in the reamer disclosed in the drawings. In the following detailed description, the manner in which these features are incorporated will be disclosed, and other objects and features of the invention will be manifest.

Referring now to the drawings, I show a reamer having a central mandrel 11, cutting segments 12 and 13, and spring centering guides 14 and 16. The segments 12—13 preferably have cutting edges spirally oppositely disposed as shown in Fig. 1, thereby having the cutting edges of a succeeding segment cross the cutting lines of a previous segment at a different angle, breaking up the chips more readily, and, I find, providing a more effective reamer when the sections are pulled forwardly by the inter-engaging hook-like surfaces hereinafter referred to. Segment confining collars 17 and 18 hold the segments and spring guides in assembled position on the mandrel. The confining collar 17 is elongated and is loosely mounted on the mandrel to permit longitudinal movement thereon. It is held against the segments by a spring 19, the opposite end of the spring being confined by a confining sleeve 21 applied by right hand threads 22 to the end of the mandrel. A stop of suitable character, as illustrated, is provided to limit the movement of the confining sleeve 21 when the sleeve is turned up to the stop. It may be engaged by a wrench or suitable tool at the head 23 for turning the reamer within a hole which is to be bored. With the present form, I do not pin the sleeve 21 on the mandrel, so that it is impossible to turn the reamer backwards.

At the opposite end of the reamer, an adjusting sleeve 24 is provided, threaded on right hand threads 26. This adjusting sleeve bears against the collar 18 and the reamer diameter is adjusted by turning the sleeve 24, a wrench engaging portion 27 being provided for the purpose. Within the end of the adjusting sleeve 24, I provide a plug 28, which may be used merely for the purpose of preventing oil and dirt from getting into the adjusting sleeve and fouling the threads, or which, by means of an extension 28a, may be made to engage against the end of the mandrel to prevent accidental relative movement between the adjusting sleeve and mandrel. It will be seen that the plug 28 has left hand threads, and, if the extension 28a is brought into contact with the end of the mandrel, it will make an effective lock which will prevent the adjusting sleeve from backing up. I show the plug 28 designed to be turned with an ordinary screw driver, but it is understood it may be formed to fit any usual type of turning tool.

I shall refer now more particularly to the cutting segments, centering guides and manner of mounting the same on the mandrel. The mandrel has a pair of segment engaging surfaces 29 which slope outwardly and, at the same time, slope in a sideways direction, as appears clear from Figs. 2 and 6. These two surfaces, in the embodiment shown, are oppositely disposed and between them are a pair of shoulders 31 which also increase in thickness toward one end. Between the shoulders and tapered mandrel surfaces are slots 32 which have a function in connection with the guides 14 and 16, which will be explained. I also provide pins 33 which project slightly into the slots 32 at opposite sides of the mandrel. Spaced slightly away from the shoulders, also at opposite sides of the mandrel, are a pair of inserts 34 which serve to engage in slots 36 on the under sides of the segments in the manner shown in Fig. 4. These inserts, functioning in the nature of hooks, serve a purpose which will be brought out more in particular hereinafter.

The segments have under surfaces 37 which co-operate with the surfaces 29 on the mandrel so that as the segments are slid along the mandrel longitudinally, the spiral cutting edges are adjusted to cut on a larger or smaller diameter depending upon the direction of movement. As the segments shift, due to the adjustment by adjusting sleeve 24, the cutting area along the spiral cutting edges is shifted, but the adjustment is made so that the segments always cut along or in back of the center line, which is midway between the two side edges of the segments. This feature is also referred to in my co-pending application, Serial #410,299, filed November 29, 1929.

Looking at Fig. 4, the segments cut when turned in the direction indicated by the arrow in Fig. 4. It will be seen that the slot 36 is near the forward edge of the segment and the engagement between the slot and the hook 34 is such as to have a tendency to draw the front edge of the segment down toward the mandrel. There is a drag on the segment in a direction opposite to the direction of movement thereof and since the portion of the segment which cuts is toward the rear edge, there will be no tendency of the segment to lift. On the contrary, it will tend to be held more tightly against the mandrel. So pronounced is this tendency, that I have found that I can support the segments so loosely that the collars 17 and 18 will not hold them down on the mandrel, and, with the segments in this loose condition, I am able to ream a perfect circular surface and produce every bit as satisfactory a finish as if the collars 17 and 18 were forced tightly against the segments. In the actual use of the reamer, these collars are brought up fairly tight. The advantage of having the segments operate in this way, however, is clear when it is considered that the spring 19 forces the segments in a direction to decrease the diameter thereof. At times there is very little tension on this spring, because the reamer is designed to have a very wide range of adjustments. If there was a tendency for the segments to lift up when the spring applied only very slight pressure, they could force some movement against the spring and thereby produce a larger reamed opening than that for which the reamer is set. I am able therefore to adjust the reamer over a wide range, with no adjustment except the adjusting sleeve 24.

The guides 14 and 16 are identical. They comprise a straight portion 41 (Fig. 7) which extends down into the slots 32 and lies along the shoulder 31, a flange 42 being turned over at the bottom to form a relatively wider bearing surface at the bottom of the slot. The guides are formed of spring material and have a portion 43 of general arcuate shape which extends outwardly slightly beyond the cutting edges, and has its end bearing on a flat portion 44 on the cutting segment. The ends 46 and 47 of the portion 43 are bent outwardly to facilitate insertion and removal of the reamer from a hole, which may be a bearing, for example. The portion 41 is also shaped at the ends so as to be confined by the collars 17 and 18. The guides, being formed of spring material, can be compressed within an opening and so hold the reamer along a true axial line. This is important when an old bearing surface is being reamed. Such openings are usually found to be somewhat oval in cross sections, sometimes as much as a few thousandths of an inch, and greater in diameter in one direction than in an opposite direction. The guides will spring out and, no matter what position the reamer occupies within the opening, it is obvious that it will always be held in proper cutting position, so that the cutting will take place on the "high" spots of the bearing opening.

Figure 2:
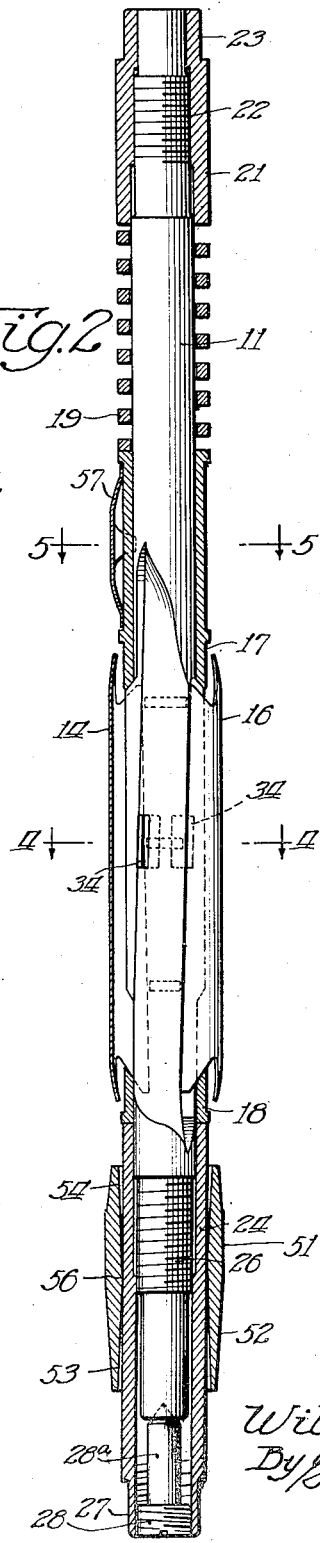
Fig. 2 is a longitudinal sectional view taken along the line 2—2 of Fig. 1.
Figure 3:
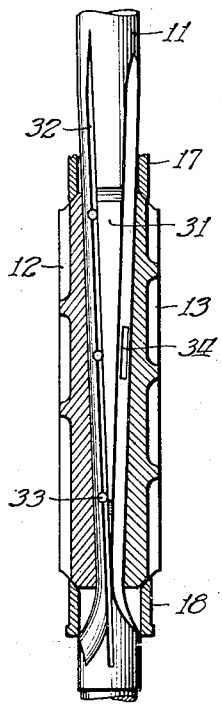
Fig. 3 is a fragmentary longitudinal sectional view, with some of the parts removed, the section being taken on a plane at right angles to the section of Fig. 2.

I find that sometimes, for various reasons, it is advisable to have the guides adjustable with respect to each other. I provide means to permit an automatic adjustment including the pins 33, which project slightly into the slots 32, which receive the guides and are loose enough to have some end movement. That is to say, they can move from one slot into the opposite slot. It will be seen, therefore, that if the pressure is greater on one spring guide than on the other, the pins will recede away from the side of greater pressure, thus permitting one guide to be moved slightly toward the center of the mandrel and the other guide to be moved slightly away from the center. In this way, the pressure on the two guides is equalized. One of the advantages of this construction is that one guide may be slightly more resilient than the other, due to slight differences in heat treatment and the like, and, if one tends to give more than the other, the sliding movement of the pins will equalize the guides in a very efficient way. It is to be noted that the guides are merely held in position by the collars, but are not tightly confined, as shown in Fig. 2.

While the spring guides 14 and 16 maintain the reamer in proper alignment within the opening, I provide additional centering means which are of value principally when the reamer is only partially within the opening, as, for example, when starting the reamer operations. A centering bushing 51 is slidably supported on the adjusting sleeve 24 and has a tapered end 52 which extends into the hole to be reamed and thus holds the forward or advanced end of the mandrel in alignment with the opening. I have found that no matter how carefully the mandrel is constructed there is always a possibility of its becoming slightly out of line, particularly at the ends, and, if the bushing 51 were to fit snugly on the sleeve 24, there might be an error of a few thousandths of an inch in the centering adjustment accomplished by the bushing 51. Accordingly, I taper the inside surfaces 53 and 54 slightly away from a mid-point 56. This permits sufficient relative movement between the mandrel and bushing to counteract for the inaccuracies in the mandrel while, at the same time, maintaining the reamer as a whole centralized.

I also provide a mandrel centering spring 57 on the collar 17, this centering spring gripping the collar at its ends, but having a plurality of portions which extend farther out than the ends and which will expand within an opening in such a way as to hold the reamer in alignment after it has passed partly through the opening which is being reamed.

In Fig. 8 I show a modified construction of the guide which is, in substantially all respects, similar to the guides shown in Fig. 7, and I employ the same reference characters thereon prefixed by the numeral "one". In the portion 141, however, I provide a number of holes 140 which are for the purpose of making the spring somewhat more resilient by decreasing the amount of metal along the flexing area. This permits the guide to be formed of relatively thicker stock, which is an advantage in some ways.

Since the spring guides 14 and 16 have one end bearing against the segments, it is obvious that they also tend to hold the segments down on the mandrel, and so add to the other factors tending to prevent accidental or unintentional enlargement of the reamer while still maintaining the adjustment methods disclosed.

I describe my invention in detail so those skilled in the art may understand and practice the same. It is obvious, however, that the invention is limited only by the scope of the appended claims.

What I claim as new and desire to secure by United States Letters Patent is:

1. In an expansion reamer, a mandrel, plurality of cutting segments supported on the periphery of the mandrel, said cutting segments having a flat section along one edge, and guide members formed of spring material, said guide members being of general U cross section with one edge of the U supported on the mandrel, the opposite edge of the U extending over the adjacent cutting segment and adapted to rest on the flat section of said segment.

2. In an expansion reamer, a mandrel, plurality of cutting segments supported on the periphery of the mandrel, said cutting segments having a flat section along one edge, and guide members formed of spring material, said guide members being of general U cross section with one edge of the U supported on the mandrel, the opposite edge of the U extending over the adjacent cutting segment and adapted to rest on the flat section of said segment, said guide members projecting radially beyond the cutting segments, but adapted to be compressed to substantially the radius of the cutting segments when the reamer is confined within a circular opening during a reaming operation.

3. In an expansion reamer, a mandrel, having a plurality of tapering segment supporting surfaces, a plurality of segments having spiral cutting edges adapted to be supported on said tapering mandrel surfaces, adjustable means for confining the cutting segments on said surfaces, a plurality of guide members, one for each segment, said guide members being formed of spring material and having a general U-shaped cross section forming two legs of the U and a curved portion connecting the two legs, one leg portion being disposed in a longitudinal slot provided in the mandrel and having its ends shaped to be retained by the segment retaining means, the other leg of the guide member extending over and adapted to contact with the adjacent cutting segments.

4. In an expansion reamer, a mandrel, having a plurality of tapering segment supporting surfaces, a plurality of segments having spiral cutting edges adapted to be supported on said tapering mandrel surfaces, a plurality of guide members, one for each segment, said guide members being formed of spring material and having a general U-shaped cross section forming two legs of the U and a curved portion connecting the two legs, one leg portion being disposed in a longitudinal tapered slot provided in the mandrel and having its ends shaped to be retained by segment confining means, the other leg of the guide member extending over and adapted to contact with the adjacent cutting segment, and adjustable means for confining the cutting segments on said surfaces and the guide members in said slots, said confining means operable for simultaneous expansion of the segments and guide members.

5. In an expansion reamer, a mandrel, having a pair of tapering segment supporting surfaces, and longitudinal slots between the surfaces, pins extending loosely through the mandrel and projecting into the longitudinal slots, a pair of segments having spiral cutting edges, means for supporting said segments on the tapered surfaces, and guides disposed between the segments each guide having one end in one of said slots and resting on the ends of said pins, said guides projecting radially beyond the cutting segments, and the pins supporting the guides to permit radial relative compensatory movement of the guides.

6. In an expansion reamer, a mandrel, having segment supporting surfaces and longitudinal slots between the surfaces, a hook-like projection extending from each surface near the forward edge thereof, cutting segments having spiral cutting edges and a relatively flat section near one edge thereof, and grooves into which the hook-like projections extend, guide members formed of spring material of general U-shape, having one leg of the U extending into the slot of the mandrel between the segments and the other leg of the U extending over the forward edge of the cutting segments and adapted to contact with the flat portion of the cutting segments, and means for supporting the cutting segments and guides on the mandrel.

7. The combination set forth in claim 6 including pins extending through the mandrel, and having their ends projecting in said slots, whereby the spring guides are relatively automatically adjusted.

8. In an expansion reamer, a mandrel, a plurality of cutting segments disposed intermediate the ends of the mandrel, means for adjustably supporting the segments on the ends of the mandrel, an expanding spring guide on the mandrel near one end of the cutting segments, and a guide bushing slidable on the mandrel near the opposite end of the cutting segments, the guide bushing having an inside diameter slightly greater than the supporting surface on the mandrel intermediate its ends, but said inside surface tapering outwardly toward the ends of the bushing, whereby the bushing is adapted to have slight angular adjustment on the mandrel.

9. In an expansion reamer, a mandrel, a plurality of cutting segments with spiral cutting edges supported on the periphery of the mandrel, and guide members formed of spring material, each guide member having one portion supported on the mandrel between adjacent segments, a curved portion extending over the edge of a segment, and another portion resting on said segment near the edge thereof.

10. In an expansion reamer, a mandrel having tapering segment supporting surfaces, a key near the forward edge of each surface projecting therefrom tangentially to the axis to form a hook-like immovable forwardly extending projection, cutting segments with spiral cutting edges, having bottom surfaces corresponding to the tapered surfaces on the mandrel and each having a slot near the forward edge thereof into which said hook-like projection on the mandrel extends to form a hook-like support for the cutting segments, said hook-like support in each segment being located near the edge thereof which is leading with respect to the reaming direction of rotation of the reamer, whereby pressure applied to the spiral cutting edges during a reamer operation will have the effect of drawing the segment tighter against the tapered surface of the mandrel.

11. In an expansion reamer, a mandrel having tapered segment supporting surfaces, projections extending from the tapered surfaces, said projections each located along an edge of the surface which is leading with respect to the reaming direction of rotation of the reamer and having a tangentially disposed engaging surface thereby providing a hook-like construction with respect to the tapered surface, cutting segments with spiral cutting edges adapted to be supported on the tapered surfaces, each cutting segment having a slot near its edge which is leading with respect to the reaming direction of rotation of the reamer for engaging over the hook-like projection on the tapered surface, a pair of collars on the mandrel, beveled to engage over the ends of the cutting segments, a threaded adjusting sleeve bearing against one collar and effective to move the segments upwardly on the tapered surfaces to expand the reamer, and a compression spring bearing against the other collar and tending to contract the reamer.

12. An expansion reamer comprising a mandrel and a plurality of radially disposed cutting segments substantially filling the periphery of the reamer, said mandrel and segments having interengaging surfaces to effect adjustment thereof by longitudinal movement of the sections, and said segments and mandrel having longitudinal hook-like interengaging portions along leading edges of the cutting segments for pulling the cutting sections around by a reaming rotation of the mandrel, said inter-engaging portions being located along edges of the sections which are leading with respect to the direction of reaming rotation of the reamer.

13. In an expansion reamer, a mandrel having tapering segment supporting surfaces, longitudinal cutting segments each having a corresponding surface resting upon a mandrel supporting surface and longitudinally movable thereon to vary the cutting diameter thereof, a key extending from each supporting surface positioned near the forward edge of the corresponding cutting segment and having a longitudinally extending pulling face disposed relative to the supporting surface to form a hook-like projection, each cutting segment having a longitudinal key engaging surface near its edge which is forward with respect to the direction of reaming rotation of the reamer and which surface is disposed relative to the resting surface of its segment to provide a hook-like portion for engaging the hook-like projection of the key, whereby a reaming operation will tend to draw the segments tighter against their supporting surfaces.

14. An expansion reamer comprising a mandrel and a plurality of radially disposed cutting segments substantially filling the periphery of the reamer, said segments having cutting edges spirally oppositely disposed, said mandrel and segments having interengaging surfaces to effect adjustment thereof by longitudinal movement of the sections and said segments and mandrel having longitudinal interengaging portions along leading edges of the cutting segments for pulling the cutting sections around by a reaming rotation of the mandrel, said interengaging portions being located along edges of the sections which are leading with respect to the direction of reaming rotation of the reamer.

WILLIAM H. EVANS.